United States Patent
Shikayama et al.

(10) Patent No.: US 8,502,423 B2
(45) Date of Patent: Aug. 6, 2013

(54) LINEAR MOTOR

(75) Inventors: Toru Shikayama, Kitakyushu (JP);
Masanobu Kakihara, Kitakyushu (JP);
Motomichi Ohto, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 225 days.

(21) Appl. No.: 13/216,211

(22) Filed: Aug. 23, 2011

(65) Prior Publication Data
US 2012/0049657 A1 Mar. 1, 2012

(30) Foreign Application Priority Data
Aug. 24, 2010 (JP) .................................. 2010-187459

(51) Int. Cl.
*H02K 41/02* (2006.01)
(52) U.S. Cl.
USPC ....................................................... 310/12.25
(58) Field of Classification Search
USPC .................. 310/12.24, 12.25, 12.26
See application file for complete search history.

(56) References Cited

U.S. PATENT DOCUMENTS

| | | | |
|---|---|---|---|
| 5,910,691 A * | 6/1999 | Wavre | 310/12.18 |
| 2004/0207271 A1* | 10/2004 | Korenaga et al. | 310/12 |
| 2010/0052437 A1* | 3/2010 | Froeschle et al. | 310/12.25 |
| 2011/0012440 A1* | 1/2011 | Toyota et al. | 310/12.24 |

FOREIGN PATENT DOCUMENTS

| | | |
|---|---|---|
| JP | 2005-269693 | 9/2005 |
| JP | 2007-006545 | 1/2007 |
| JP | 2010-63201 | 3/2010 |
| JP | 2010-148167 | 7/2010 |

OTHER PUBLICATIONS

Japanese Office Action for corresponding JP Application No. 2010-187459, Feb. 19, 2013.
Japanese Office Action for corresponding JP Application No. 2010-187459, Jul. 17, 2012.

* cited by examiner

*Primary Examiner* — Nguyen N Hanh
(74) *Attorney, Agent, or Firm* — Ditthavong Mori & Steiner, P.C.

(57) ABSTRACT

A linear motor includes a field including main-magnetic-pole permanent magnets magnetized in a direction of a generation magnetic field, and sub-magnetic-pole permanent magnets magnetized in a direction different from the direction of magnetic poles of the main-magnetic-pole permanent magnets, portions of the main-magnetic-pole permanent magnets located at a magnetic-field generation side being replaced with soft magnetic materials; and an armature including an armature core having teeth and armature coils wound around the armature cores. The linear motor satisfies $\lambda < \tau$, where $\lambda$ is a pitch of the magnetic poles of the field, and $\tau$ is a pitch of the teeth.

4 Claims, 6 Drawing Sheets

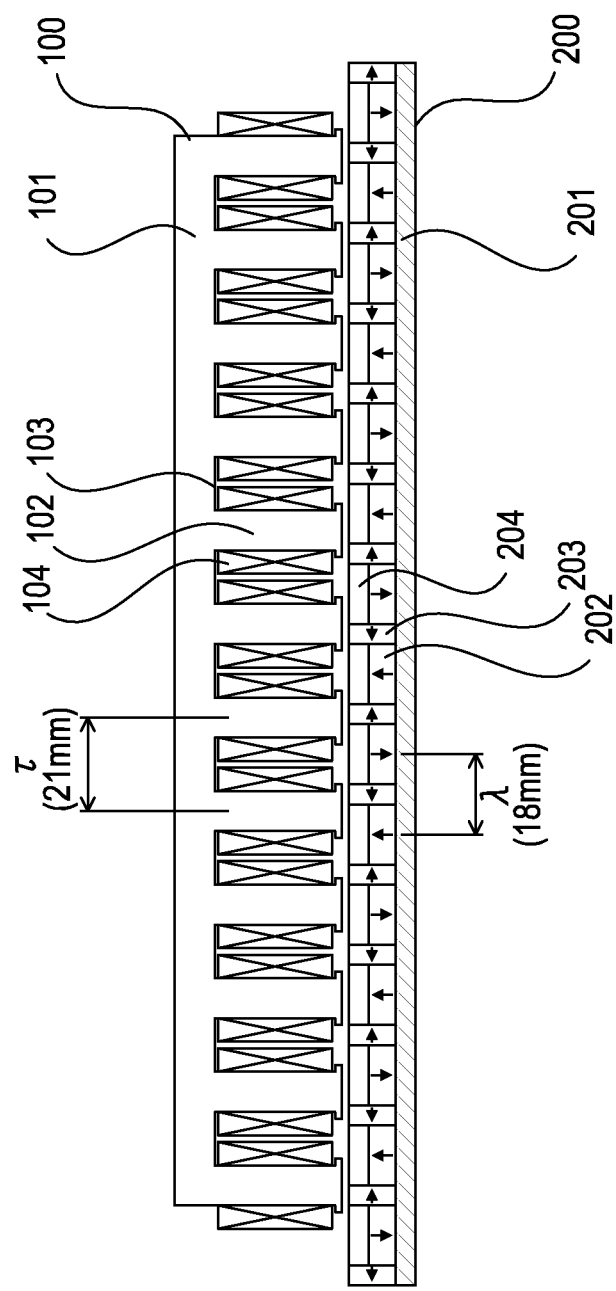

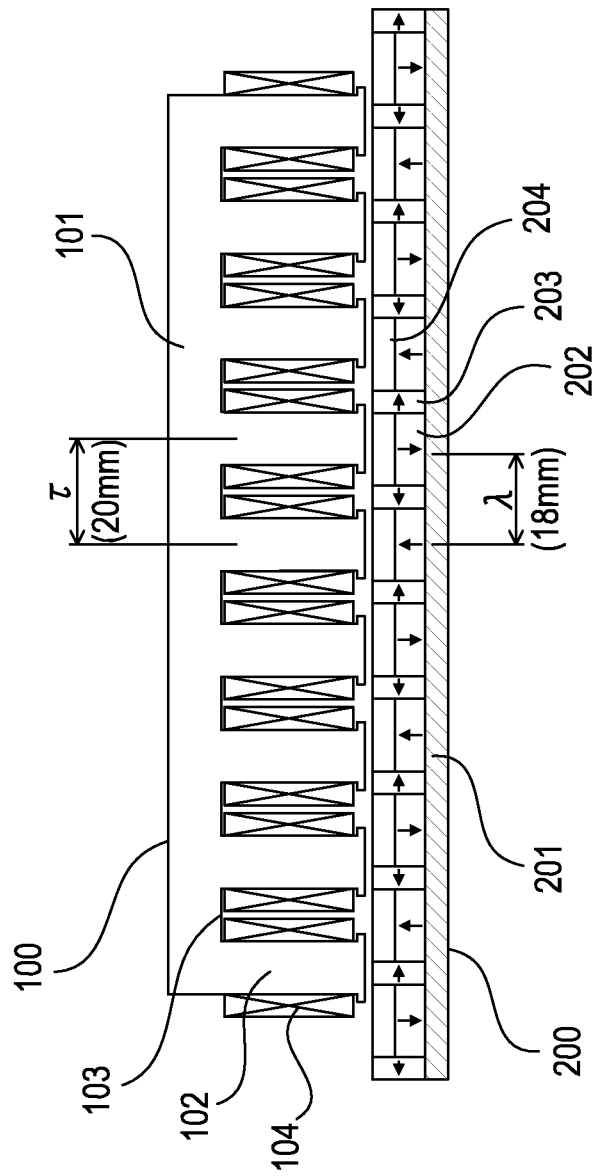

ably Patent Application Publication No. 2010-63201 pub-
LINEAR MOTOR

CROSS-REFERENCE TO RELATED APPLICATION

The present application claims priority under 35 U.S.C. §119 to Japanese Patent Application No. 2010-187459 filed Aug. 24, 2010. The contents of this application are incorporated herein by reference in their entirety.

BACKGROUND OF THE INVENTION

1. Field of the Invention

The present invention relates to a linear motor.

2. Description of the Related Art

As a linear motor used for table feed, there has been suggested a structure disclosed in, for example, Japanese Unexamined Patent Application Publication No. 2010-63201 published Mar. 18, 2010. The structure includes a field arranged to face an armature with a gap (magnetic gap) interposed therebetween. The field includes main-magnetic-pole permanent magnets magnetized in a direction of a generation magnetic field, and sub-magnetic-pole permanent magnets magnetized in a direction different from the direction of magnetic poles of the main-magnetic-pole permanent magnets. Portions of the main-magnetic-pole permanent magnets located at a magnetic-field generation side are replaced with soft magnetic materials. Hence, the structure has so-called Halbach array.

SUMMARY OF THE INVENTION

According to an aspect of the present invention, there is provided a linear motor including a field including main-magnetic-pole permanent magnets magnetized in a direction of a generation magnetic field, and sub-magnetic-pole permanent magnets magnetized in a direction different from the direction of magnetic poles of the main-magnetic-pole permanent magnets, portions of the main-magnetic-pole permanent magnets located at a magnetic-field generation side being replaced with soft magnetic materials; and an armature arranged to face the field with a gap interposed therebetween and including an armature core having teeth and armature coils wound around the armature cores. The linear motor satisfies $\lambda<\tau$, where $\lambda$ is a pitch of the magnetic poles of the field, and $\tau$ is a pitch of the teeth.

BRIEF DESCRIPTION OF THE DRAWINGS

The present invention will be described in further detail with reference to the accompanying drawings wherein:

FIG. 3 is a cross-sectional view of a linear motor according to a second embodiment;

FIG. 4 is a cross-sectional view of a linear motor according to a third embodiment;

DETAILED DESCRIPTION OF THE EMBODIMENTS

Embodiments of the present invention will be described below with reference to the drawings.

First Embodiment

Figure 1:
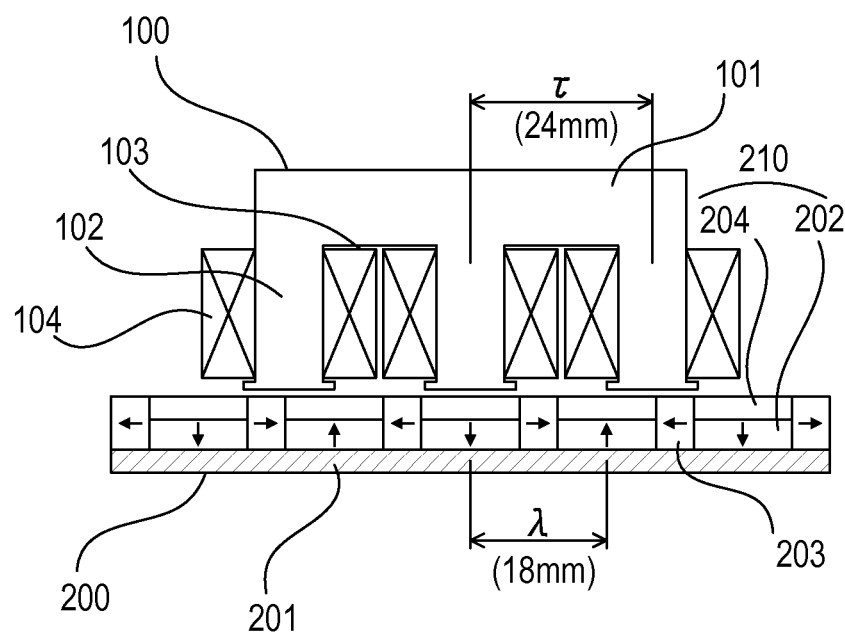
FIG. 1 is a cross-sectional view of a linear motor according to a first embodiment.

FIG. 1 is a cross-sectional view of a linear motor according to a first embodiment.

FIG. 1 illustrates a rotor (unrolled) 100, an armature core 101, teeth 102, slots 103, armature coils 104, a stator 200, a yoke 201, main-magnetic-pole permanent magnets 202, sub-magnetic-pole permanent magnets 203, soft magnetic materials 204, and main magnetic poles 210.

In the linear motor according to the first embodiment, an armature is the rotor 100, and a field is the stator 200. The rotor 100 is arranged to face the stator 200 with a gap interposed therebetween, and moves in the longitudinal direction of the stator 200 (left-right direction of the sheet of the drawing).

The rotor 100 includes the armature core 101 and the armature coils 104. The armature core 101 has three teeth 102 protruding toward the gap. The slots 103 are formed among the teeth 102. The slots 103 accommodate the armature coils 104. In particular, a three-phase armature coil 104 is wound around each of the teeth 102 in a concentrated manner.

The stator 200 includes the yoke 201, the main-magnetic-pole permanent magnets 202, the sub-magnetic-pole permanent magnets 203, and the soft magnetic materials 204. The main-magnetic-pole permanent magnets 202 and the sub-magnetic-pole permanent magnets 203 magnetized in a direction different from a direction of magnetic poles of the main-magnetic-pole permanent magnets 202 are arranged on the yoke 201 such that magnetic fields are generated toward the gap. Hence, so-called Halbach array is provided. Further, the soft magnetic materials 204 are arranged at gap-side portions of the main-magnetic-pole permanent magnets 202. The main-magnetic-pole permanent magnets 202 and the sub-magnetic-pole permanent magnets 203 each use a high-energy-product neodymium magnet. The soft magnetic materials 204 each use, for example, a laminated silicon steel plate, a SMC core (core formed of fine iron powder by compression molding), or 3% Si iron. The silicon steel plate may be non-directional or directional.

When Nt is the number of teeth of the rotor 100, and Np is the number of magnetic poles of the stator 200 facing the rotor 100, a combination of (Nt, Np) is (3, 4). That is, the linear motor according to the first embodiment has a basic structure of three phases, three teeth, and four poles. Consequently, the relationship between a pitch $\lambda$ of the magnetic poles of the stator 200 and a pitch $\tau$ of the teeth 102 of the rotor 100 is $\lambda<\tau$. For example, when the pitch of the teeth 102 of the stator 200 is $\tau=24$ mm, the pitch of the magnetic poles is $\lambda=18$ mm.

Figure 2:
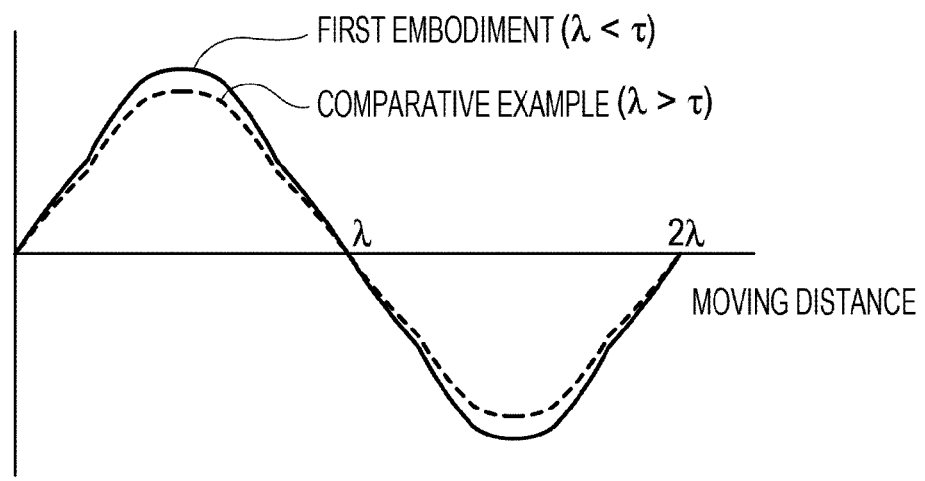
FIG. 2 is an illustration for comparison of values of "induced voltage/speed" between a comparative example and the first embodiment.

Next, an effect of the above-described configuration will be described with reference to FIG. 2. FIG. 2 illustrates comparison of values of "induced voltage/speed" per phase between a linear motor according to a comparative example and the linear motor according to the first embodiment. FIG. 2 illustrates the result obtained by experiment and verification of a prototype. The horizontal axis is normalized with the pitch $\lambda$ of the magnetic poles. The linear motor of the comparative example is a linear motor illustrated in the figure of Japanese Unexamined Patent Application Publication No. 2010-63201, and the combination of (Nt, Np) is (3, 2). That is, a basic structure includes three phases, three teeth, and two poles. The relationship between the pitch $\lambda$ of magnetic poles and the pitch $\tau$ of teeth is $\lambda > \tau$. When the pitch of the teeth is $\tau = 24$ mm like the first embodiment, the pitch of the magnetic poles is $\lambda = 36$ mm. That is, the pitch of the magnetic poles of the comparative example is longer than $\lambda = 18$ mm of the first embodiment, by 18 mm.

As shown in FIG. 2, the amplitude of the value of "induced voltage/speed" of the first embodiment ($\lambda < \tau$) is 1.15 times larger than the value of the comparative example ($\lambda > \tau$). The amplitude of the value of "induced voltage/speed" is an induced voltage constant. When the induced voltage constant is tripled, the result represents a thrust constant. That is, the linear motor according to the first embodiment has a thrust that is 1.15 times larger than that of the linear motor according to the comparative example.

Linear motors with combinations of (Nt, Np) being (3, 2) and (3, 4) typically have a winding factor of 0.866. Hence, it is expected that the thrust constant is also the same value. Even with a typical Halbach array structure (in which a soft magnetic material is not arranged at a magnetic-field generation side of a main-magnetic-pole permanent magnet), the gap magnetic-flux density is restricted by magnetic saturation. Thus, the linear motors of (3, 2) and (3, 4) have substantially the same thrust constants.

However, if the soft magnetic material is arranged at the magnetic-field generation side of the main-magnetic-pole permanent magnet like the first embodiment or the comparative example, the gap magnetic-flux density can be increased to a saturation magnetic-flux density of the soft magnetic material. A saturation magnetic-flux density of a soft magnetic material is markedly larger than that of a permanent magnet. Hence, the gap magnetic-flux density becomes larger than that of the typical Halbach array structure. Further, if the width of the main-magnetic-pole permanent magnet is decreased, magnetic saturation of the main-magnetic-pole permanent magnet likely occurs. The effect of an increase in gap magnetic-flux density is further enhanced. That is, even with the same pitch $\tau$ of the teeth, by decreasing the pitch $\lambda$ of the magnetic poles to satisfy $\lambda < \tau$ like the first embodiment, the width of the main-magnetic-pole permanent magnet is decreased, and the gap magnetic-flux density can be increased almost around the saturation magnetic-flux density of the soft magnetic material. The increase effect cannot be obtained by the structure with $\lambda > \tau$ of the comparative example, and the effect is significantly advantageous as described above.

Second Embodiment

FIG. 3 is a cross-sectional view of a linear motor according to a second embodiment. The second embodiment differs from the first embodiment in that the combination (Nt, Np) of the number Nt of teeth and the number Np of magnetic poles is (12, 14) as shown in FIG. 3.

The second embodiment also satisfies $\lambda < \tau$ like the first embodiment. For example, if the pitch of the magnetic poles of the rotor 100 is $\lambda = 18$ mm like the first embodiment, the pitch of the teeth 102 of the stator 200 is $\tau = 21$ mm.

Since the second embodiment has the above-described configuration, the gap magnetic-flux density can be increased and the thrust can be increased like the first embodiment. Also, the winding factor in the second embodiment is 0.933 that is 1.08 times larger than 0.866 of the winding factor in the first embodiment. As described above, the winding factor can be increased as the difference $\tau - \lambda$ (6 mm in the first embodiment, 3 mm in the second embodiment) is decreased. The effect of the present invention can be further enhanced. Accordingly, the thrust can be increased more than the thrust in the first embodiment.

Third Embodiment

FIG. 4 is a cross-sectional view of a linear motor according to a third embodiment.

In the third embodiment, the combination (Nt, Np) of the number Nt of teeth and the number Np of magnetic poles is (9, 10) as shown in FIG. 4.

The third embodiment also satisfies $\lambda < \tau$. For example, if the pitch of the magnetic poles of the rotor 100 is $\lambda = 18$ mm, the pitch of the teeth 102 of the stator 200 is $\tau = 20$ mm.

Since the third embodiment has the above-described configuration, the gap magnetic-flux density can be increased and the thrust can be increased like the first and second embodiments. Also, the winding factor in the third embodiment is 0.945 that is 1.09 times larger than 0.866 of the winding factor in the first embodiment. Similarly to the second embodiment, since the difference $\tau - \lambda$ is as small as 2 mm, the effect of the present invention can be further enhanced. Accordingly, the thrust can be further increased like the second embodiment.

Fourth Embodiment

Figure 5A:
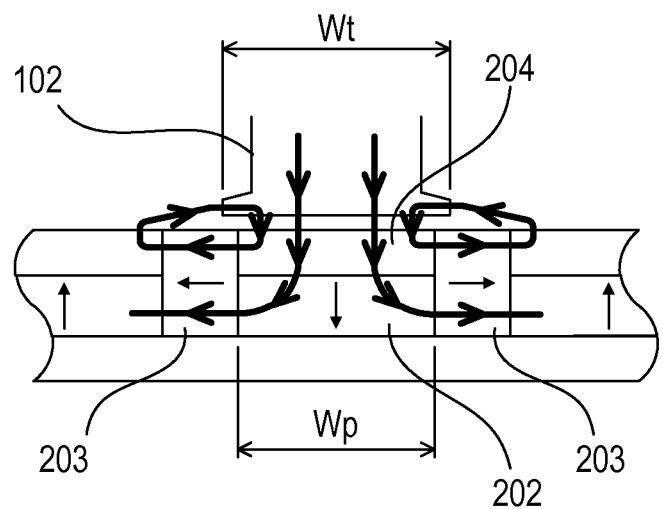
FIG. 5A is a schematic illustration showing magnetic flux lines of a magnet of a linear motor according to a comparative example.
Figure 5B:
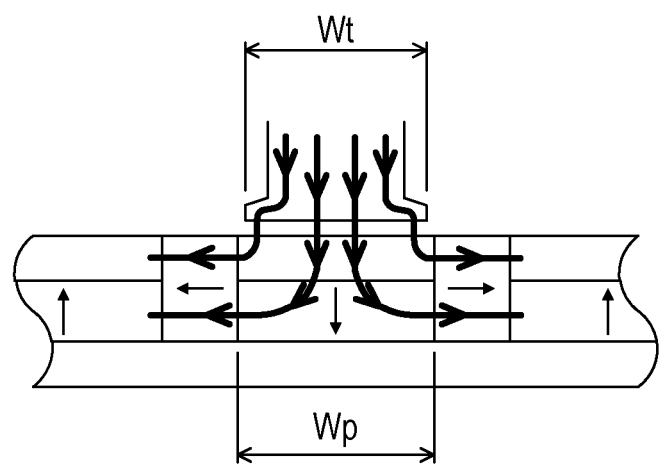
FIG. 5B is a schematic illustration showing magnetic flux lines of a linear motor according to a fourth embodiment.

FIG. 5A is a schematic illustration showing magnetic flux lines of a linear motor according to a comparative example. FIG. 5B is a schematic illustration showing magnetic flux lines of a linear motor according to a fourth embodiment. FIGS. 5A and 5B express areas around gaps in an enlarged manner. When Wt is a width of each of the teeth 102 at a gap plane of the linear motor, and Wp is a width of each of the soft magnetic materials 204, the comparative example meets an expression as follows:

$Wt > Wp$, whereas the fourth embodiment meets an expression as follows:

$Wt \leq Wp$.

The magnetic flux of the linear motor according to the comparative example ($Wt > Wp$) leaks at left and right edges of a distal end of the tooth 102. The number of interlinkage magnetic fluxes of the armature coil is decreased, and the thrust is decreased. In contrast, with the linear motor according to the fourth embodiment ($Wt \leq Wp$), the leakage of the magnetic flux is decreased. Consequently, the number of interlinkage magnetic fluxes of the armature coil is markedly increased, and the thrust larger than that of the comparative example can be generated.

Fifth Embodiment

Figure 6:
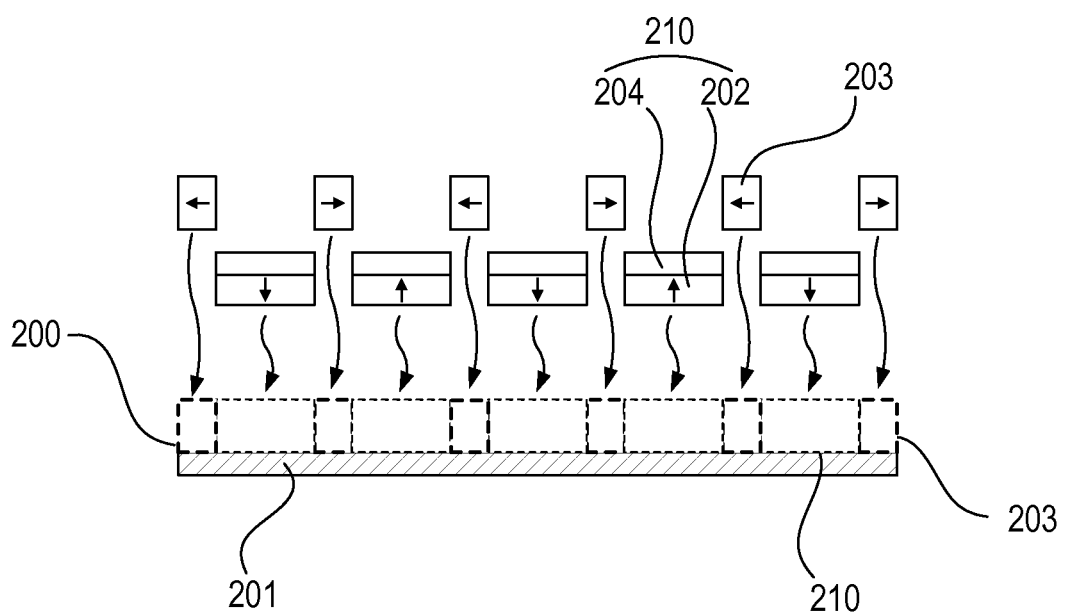
FIG. 6 is a schematic illustration in a cross-sectional view for explaining an assembly method of a field according to a fifth embodiment.

FIG. 6 is a schematic illustration in a cross-sectional view for explaining an assembly method of a field according to a fifth embodiment.

The fifth embodiment forms the stator 200 by previously unitizing the soft magnetic material 204 and the main-magnetic-pole permanent magnet 202 to provide the main magnetic pole 210, combining the main magnetic pole 210 with the sub-magnetic-pole permanent magnet 202, and arranging the combined components on the yoke 201. In particular, the main magnetic pole 210 is formed of the soft magnetic material 204 and the main-magnetic-pole permanent magnet 202 by bonding or mechanical fastening.

Since the fifth embodiment has the above-described configuration, the main magnetic pole 210 can be conceived as a single permanent magnet. The stator can be assembled by a method like an assembly method of the typical Halbach arrangement structure formed of two-type materials for the main magnetic pole and the sub magnetic pole, i.e., by a method like a conventional assembly method. Accordingly, the stator described in any of the first to fourth embodiments can be easily fabricated, and the thrust can be increased.

In the above description of any of the embodiments, the armature is the rotor, and the field is the stator; however, the relationship between the armature and the field may be reversed.

Also, in the above description, the gap plane is arranged at one side; however, gap planes may be arranged at left and right sides to cancel magnetic attraction forces. Even in this case, any of the embodiments can be established.

Also, in the above description of any of the embodiments, the combinations (Nt, Np) of the number Nt of the teeth and the number Np of the magnetic poles are (3, 4), (12, 14), and (9, 10); however, any of the embodiments is suitable for any of other combinations such as (3, 5), (6, 7), (15, 16), and (15, 18), or any of integral multiples of these combinations. Any of the embodiments is suitable for a configuration at least with the relationship between the pitch $\lambda$ of the magnetic poles and the pitch $\tau$ of the teeth satisfying $\lambda < \tau$.

Also, in the above description, the cross-sectional shapes of the main-magnetic-pole permanent magnet, sub-magnetic-pole permanent magnet, and soft magnetic material each are a rectangle; however, the shapes of any of the embodiments each are not limited to a rectangle and may be a trapezoid. Alternatively, the sides of a rectangle may have polygonal shapes or arcs as long as $\lambda < \tau$ and $Wt \leq Wp$ are satisfied.

Further, in the above description, the armature coil is wound around each of the teeth by concentrated winding; however, any of the embodiments is suitable for a configuration in which auxiliary teeth are provided, teeth are partly provided with the armature coils, or the armature coil is wound by distributed winding as long as at least the relationship $\lambda < \tau$ is satisfied.

With the linear motor according to any of the embodiments of the present invention, when $\lambda$ is the pitch of the magnetic poles of the field and $\tau$ is the pitch of the teeth of the armature core, by satisfying $\lambda < \tau$, the gap magnetic-flux density can be increased and the thrust can be increased. Accordingly, the linear motor can be applied to various purposes of use, for example, for table feed of an industrial apparatus, such as a semiconductor manufacturing apparatus, a liquid crystal manufacturing apparatus, or a machine tool.

What is claimed is:

1. A linear motor comprising:
    a field including main-magnetic-pole permanent magnets magnetized in a direction of a generation magnetic field, and sub-magnetic-pole permanent magnets magnetized in a direction different from the direction of magnetic poles of the main-magnetic-pole permanent magnets, portions of the main-magnetic-pole permanent magnets located at a magnetic-field generation side being replaced with soft magnetic materials; and
    an armature arranged to face the field with a gap interposed therebetween, and including an armature core having teeth and armature coils wound around the armature cores,
    wherein an expression is satisfied as follows,
    $$\lambda < \tau,$$
    where $\lambda$ is a pitch of the magnetic poles of the field, and $\tau$ is a pitch of the teeth.

2. The linear motor according to claim 1, wherein, when Nt is the number of the teeth of the armature and Np is the number of the magnetic poles of the field, a combination of (Nt, Np) is any of combinations (3, 4), (3, 5), (6, 7), (9, 10), (15, 16), and (15, 18) or a combination of an integral multiple of any of the combinations (3, 4), (3, 5), (6, 7), (9, 10), (15, 16), and (15, 18).

3. The linear motor according to claim 1,
    wherein an expression is satisfied as follows,
    $$Wt \leq Wp,$$
    where Wt is a width of each of the teeth at a gap plane, and Wp is a width of each of the soft magnetic materials forming the field.

4. The linear motor according to claim 1, wherein the field has a main magnetic pole that is formed by previously unitizing the main-magnetic-pole permanent magnet and the soft magnetic material, and is formed by combining the main magnetic pole with the sub-magnetic-pole permanent magnet.

* * * * *